Jan. 7, 1964  R. C. VODEHNAL  3,116,909
ADJUSTABLE CHAIN TIGHTENER
Filed July 27, 1962

Rudolph C. Vodehnal
INVENTOR.

BY *Clarence A. O'Brien*
*and Harvey B. Jacobson*
Attorneys

United States Patent Office 3,116,909
Patented Jan. 7, 1964

3,116,909
ADJUSTABLE CHAIN TIGHTENER
Rudolph C. Vodehnal, Valley County, Nebr.
(R.R. 3, Box 137, Burwell, Nebr.)
Filed July 27, 1962, Ser. No. 212,860
7 Claims. (Cl. 254—78)

The present invention broadly relates to clamping devices, and more specifically to a novel chain tightener capable of quickly and effectively tightening a chain or interlocking two adjacent chains.

One of the primary objects of the present invention resides in the provision of a chain tightener which can be quickly engaged and disengaged while at the same time presenting a stable and slip proof interconnection when engaged.

Another object of the present invention resides in the provision of a relatively simple structure wherein the tightening of a chain is effected by the manual manipulation of only a single lever.

Another object of the present invention resides in the provision of a chain tightener both inexpensive to manufacture and capable of use over extended periods of time without the necessity of replacement arising due to the provision of a basically simple structure operative in a manner so as to effect only a minimum amount of wear.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
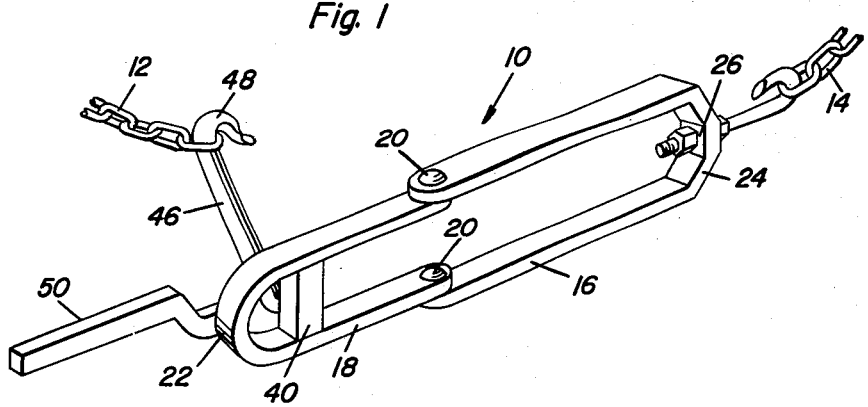
FIGURE 1 is a perspective view of the chain tightener of the present invention interconnected with opposed chain portions at the start of the tightening operation.
Figure 2:
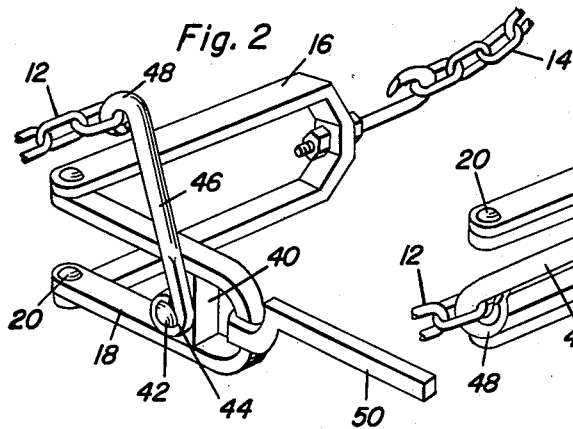
FIGURE 2 is a similar perspective view illustrating an intermediate step in the tightening operation.

Referring now more specifically to the drawings, reference numeral 10 generally designates the chain tightener comprising the present invention. This chain tightener 10, as will be appreciated from the following description, is to be used in conjunction with two chain portions 12 and 14 so as to effect a drawing together of these chain portions 12 and 14 and their retention in such a drawn together position.

Figure 3:
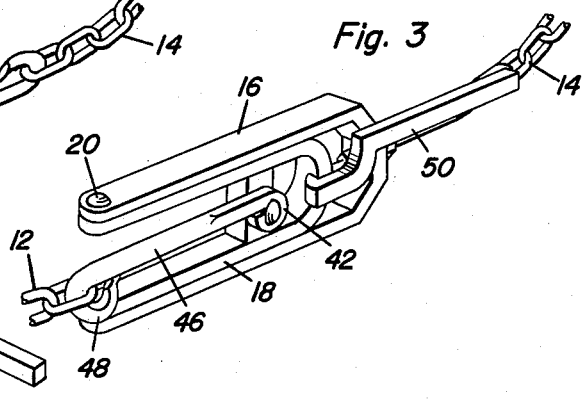
FIGURE 3 is also a similar perspective view illustrating the final chain tightening position of the tightener.
Figure 4:
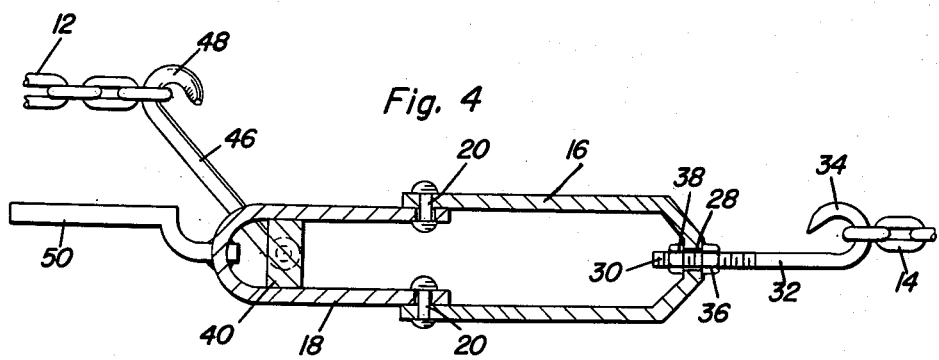
FIGURE 4 is a vertical longitudinal cross-sectional view through the tightener.

The chain tightener 10 includes two oppositely directed yokes, a larger outer yoke 16 and a smaller inner yoke 18 with the outer ends of the legs of the yoke 18 being positioned between the outer ends of the legs of the yoke 16 and pivotally secured thereto by suitable journal means 20. The yoke 18, provided with a rounded bight portion 22, is of substantially the same width as the yoke 16 and substantially shorter so as to enable the positioning of the inner yoke 18 completely within the outer yoke 16 in the manner illustrated in FIGURE 3, this being the tightened position. The bight portion 24 of the outer yoke 16 is angularly formed with a flat central section 26 having an aperture 28 therethrough so as to receive the threaded end 30 of a bolt 32 provided with a hooked outer end 34 which is intended to engage a link of the chain portion 14. Additionally, a reinforcing nut 36 is welded to the outer surface of the bight portion 24 in line with the aperture 28, the threaded end of the bolt 30 being threaded through the reinforcing nut 36 and subsequently receiving a locking nut 38 thereon, this locking nut 38 bearing against the inner surface of the bight portion thereby effecting a rigid interlocking of the hooked bolt 32 and the outer yoke 16 in a predetermined adjusted position.

Extending between the legs of the inner yoke 18 and fixedly secured thereto such as by welding is a block 40, this block 40 being positioned closer to the bight portion 22 than the free ends of the legs. Secured to one of the vertical faces of the block 40 and projecting laterally therefrom is a stub shaft 42 about which is rotatably wrapped the inner end 44 of the attaching hook 46, the outer end 48 of which is reversely bent so as to first extend rearwardly parallel to the shank of the hook 46 and then laterally outward so as to present a positive retaining means for the engaged link of the chain section 12 during the manipulation of the tightener. As will be appreciated from the drawings, the hook 46 is of such a length as to position the reversely bent end 48 beyond the outer end of the legs of the yokes 16 and 18 in the tightened condition thereby insuring against any accidental release of the device by the introduction of any external tension into the chain sections.

In order to facilitate the tightening of the tightener 10 an elongated handle means 50 is provided. This handle means has the inner end thereof fixedly secured to the bight portion 22 on the same side of the inner yoke as the hook 46, the handle 50 first extending rearwardly, then curving upwardly, and finally terminating in an elongated straight rearwardly extending hand-gripping portion.

From the foregoing descripion taken in conjunction with the drawings, the manner in which the tightener of the present invention operates so as to effectively tighten adjoining chain sections is considered to be readily apparent. Attention is first directed toward FIGURE 1 which illustrates the manner in which the tightener 10 is arranged so as to engage both the chain section 12 and the chain section 14. After these chain sections have been engaged, the handle 50 is moved so as to pivot the inner yoke 18 about the journal 20 with the hook 46, engaged with the chain section 12 simultaneously pivoting upwardly and then forwardly, the maximum tension being introduced into the system when the yoke 18 is positioned perpendicular or at ninety degrees to the yoke 16. Subsequently, the yoke 18 is brought completely around into reception within the outer yoke 16 with the handle 50 being positioned thereagainst. As will be appreciated, in this final position, illustrated in FIGURE 3, the tension on the system is slightly less than the maximum produced when the yokes 16 and 18 are at right angles to each other. Further, along these same lines, it will be noted that in order to disengage the tightener 10, the reversely bent end 48 of the hook 46 must be moved rearwardly, a situation which can only be realized by a subsequent outward pivoting of the handle 50, and as such, no accidental release of the tightener need be feared. These desirable features are brought about by the provision of two yokes, the outer ends of the legs of which are pivotally interconnected for rotation about a vertical axis with the smaller yoke being receivable within the larger yoke, this smaller yoke having an elongated hook secured thereto for rotation about a horizontal axis perpendicular to the axis about which the yokes are rotatable, the hook being restricted to only rotational movement within a vertical plane parallel to the yoke upon which it is rotatably mounted, this hook being of a length so as to enable its outer reversely bent end to extend beyond the outer ends of the legs of the yokes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A chain tightener consisting of first and second means pivotally interconnected for rotation about a first axis, hook means pivotally secured to said first means for rotation about an axis perpendicular to said first axis, means on said second means for releasably engaging a first chain section, said hook means being releasably engageable with a second chain section, said first and second means comprising inner and outer yokes, each yoke having a bight portion and parallelly extending legs, the outer ends of the legs of the inner yoke being rotatably secured to the outer ends of the legs of the outer yoke so as to enable a pivoting of the inner yoke from a first position extending directly outward from the outer yoke to a second position nested within the outer yoke, and a stub shaft mounted on and extending laterally outward from one side of said inner yoke intermediate the legs thereof, said hook means having one end rotatably engaged about said stub shaft thus enabling the pivotal movement of said hook means through a plane parallel to said inner yoke and about the aforementioned axis perpendicular to the axis about which the yokes pivot, upon a movement of the inner yoke toward the outer yoke, so as to effect a drawing together of the chain sections.

2. The combination of claim 1 wherein the means for releasably engaging the first chain section consists of an elongated bolt hook having an inner end secured to the bight portion of the outer yoke and an outer reversely bent end for engagement within a link of the first chain section, said hook means for engaging the second chain section including a reversely bent outer portion thereon, said reversely bent outer portion terminating in an end bent laterally out of the plane of the reversely bent outer portion so as to prevent an unintentional release of said second chain section during the pivotal movement brought about by a tightening of the tightener.

3. The combination of claim 2 wherein said last mentioned hook means is of a length so as to position the outer portion thereof beyond the outer ends of the legs of the inner yoke and subsequently beyond the yoke pivot points upon a nesting of the yokes.

4. The combination of claim 3 including handle means fixedly secured to the bight portion of the inner yoke on the same side as said last mentioned hook means, said handle means extending longitudinally outwardly from said yoke.

5. The combination of claim 4 wherein the elongated bolt hook engaging the first chain section is threadedly secured to the bight portion of the outer yoke and adjustable relative thereto, lock nut means being provided for the locking of the bolt hook in an adjusted position.

6. A chain tightener consisting of an inner yoke and an outer yoke, said yokes having bight portions and parallelly extending legs, the outer ends of the legs of the inner yoke being rotatably secured to the outer ends of the legs of the outer yoke so as to enable a pivoting of the inner yoke from a first position extending directly outward from the outer yoke to a second position nested within the outer yoke, a stub shaft mounted on and extending laterally outward from one side of said inner yoke, an elongated hook means, one end of said hook means being rotatably secured to said stub shaft for pivotal movement of the hook means solely through a plane parallel to said inner yoke about an axis perpendicular to the axis about which the inner yoke pivots, the second end of said hook means being releasably engageable with a first chain section, and means extending longitudinally from the bight portion of the outer yoke for releasably engaging a second chain section.

7. A chain tightener comprising first and second members pivotally interconnected at adjoining ends for rotation about a first axis, said members being rotatable between a first position wherein said members extend outwardly from each other and a second position wherein said members are substantially coextensive, a third member, means pivotally securing said third member to one side of said first member for rotation solely about a second axis perpendicular to said first axis, means on the outer end of said second member for releasably engaging a first chain section, and means on the outer end of the third member for releasably engaging a second chain section, said third member being of a length so as to position the means on the outer end thereof longitudinally beyond the interconnected ends of the first and second members in said second position, said third member rotating about said second axis upon movement of said first member toward said second member whereby a drawing together of the chain sections is effected.

References Cited in the file of this patent
UNITED STATES PATENTS

| | | |
|---|---|---|
| 1,758,831 | Haubert | May 13, 1930 |
| 2,824,717 | Yeager | Feb. 25, 1958 |